(12) United States Patent
Barczak (10) Patent No.: US 8,284,197 B2
(45) Date of Patent: Oct. 9, 2012

(54) METHOD AND APPARATUS FOR RENDERING INSTANCE GEOMETRY

(75) Inventor: Joshua D. Barczak, Milford, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 635 days.

(21) Appl. No.: 12/404,540

(22) Filed: Mar. 16, 2009

(65) Prior Publication Data

US 2010/0231588 A1  Sep. 16, 2010

Related U.S. Application Data

(60) Provisional application No. 61/079,920, filed on Jul. 11, 2008.

(51) Int. Cl.
*G06T 17/00* (2006.01)
*G06T 15/40* (2011.01)
*G06T 11/00* (2006.01)
*G06T 1/60* (2006.01)

(52) U.S. Cl. ........ 345/428; 345/422; 345/467; 345/468; 345/530

(58) Field of Classification Search .................. None
See application file for complete search history.

(56) References Cited

U.S. PATENT DOCUMENTS

| | | | | |
|---|---|---|---|---|
| 7,468,726 B1 * | 12/2008 | Wloka et al. | ................ | 345/421 |
| 2008/0273042 A1 * | 11/2008 | Cai et al. | ................ | 345/582 |
| 2009/0195541 A1 * | 8/2009 | Peng et al. | ................ | 345/420 |

OTHER PUBLICATIONS

Erik Millan and Isaac Rudomin. 2006. Impostors and pseudo-instancing for GPU crowd rendering. In Proceedings of the 4th international conference on Computer graphics and interactive techniques in Australasia and Southeast Asia (GRAPHITE '06). ACM, New York, NY, USA, 49-55.*

Moya, V.; Gonzalez, C.; Roca, J.; Fernandez, A.; Espasa, R.; , "Shader performance analysis on a modern GPU architecture," Microarchitecture, 2005. MICRO-38. Proceedings. 38th Annual IEEE/ACM International Symposium on , vol., No., pp. 10 pp. 364, Nov. 16-16, 2005.*

Ned Greene, Michael Kass, and Gavin Miller. 1993. Hierarchical Z-buffer visibility. In Proceedings of the 20th annual conference on Computer graphics and interactive techniques (SIGGRAPH '93). ACM, New York, NY, USA, 231-238.*

Hunki Park and JungHyun Han, "Fast Rendering of Large Crowds using GPU," Proceedings of the 7th International Conference on Entertainment Computing, Sep. 25-27, 2008, Pittsburgh, Pennsylvania, USA, pp. 197-202.*

Ryder, G. and Day, A. M. (2005), Survey of Real-Time Rendering Techniques for Crowds. Computer Graphics Forum, 24: 203-215.*

O. Ripollés, M. Chover, Optimizing the management of continuous level of detail models on GPU, Computers & Graphics, vol. 32, Issue 3, Jun. 2008, pp. 307-319.*

Ciechomski et al., Real-time Shader Rendering for Crowds in Virtual Heritage. The 6th International Symposium on Virtual Reality, Archaeology and Cultural Heritage, VAST (2005).*

(Continued)

*Primary Examiner* — Kee M Tung
*Assistant Examiner* — Zhengxi Liu
(74) *Attorney, Agent, or Firm* — Volpe and Koenig, P.C.

(57) ABSTRACT

A method and apparatus for rendering instance geometry whereby all culling, level of detail (LOD) and scene management is performed directly on a GPU.

19 Claims, 8 Drawing Sheets

OTHER PUBLICATIONS

Simon Dobbyn, John Hamill, Keith O'Conor, and Carol O'Sullivan. 2005. Geopostors: a real-time geometry / impostor crowd rendering system. In Proceedings of the 2005 symposium on Interactive 3D graphics and games (I3D '05). ACM, New York, NY, USA, 95-102.*

In-Gu Kang and JungHyun Han, Real-Time Animation of Large Crowds. R. Harper, M. Rauterberg, M. Combetto (Eds.): ICEC 2006, LNCS 4161, pp. 382-385.*

Barczak et al., "GPU-Based Scene Management for Rendering Large Crowds", AMD Inc., (2006).

Greene et al., "Hierarchical Z-Buffer Visibility", International Conference on Computer Graphics and Interactive Techniques, Proceedings of the 20th Annual Conference on Computer Graphics and Interactive Techniques, pp. 231-238, (1993).

Shopf et al., "March of the Froblins: Simulation and Rendering Massive Crowds of Intelligent and Detailed Creatures on GPU", Chapter 3, Advances in Real-Time Rendering in 3D Graphics Course—SIGGRAPH 2008, (2008).

Zhang et al., "Parallel-Split Shadow Maps for Large-Scale Virtual Environments", In Proceedings of ACM International Conference on Virtual Reality Continuum and Its Applications 2006, pp. 311-318, (2006).

Barczak et al., "GPU-Based Scene Management for Rendering Large Crowds", AMD Inc., SIGGRAPH Asia 2008, (Dec. 10-13, 2008).

Greene et al., "Hierarchical Z-Buffer Visibility", International Conference on Computer Graphics and Interactive Techniques, Proceedings of the 20th Annual Conference on Computer Graphics and Interactive Techniques, pp. 231-238, (Sep. 1993).

Shopf et al., "March of the Froblins: Simulation and Rendering Massive Crowds of Intelligent and Detailed Creatures on GPU", Chapter 3, Advances in Real-Time Rendering in 3D Graphics and Games Course—SIGGRAPH 2008, (Aug. 11-15, 2008).

Zhang et al., "Parallel-Split Shadow Maps for Large-Scale Virtual Environments", In Proceedings of ACM International Conference on Virtual Reality Continuum and Its Applications 2006, pp. 311-318, (Jun. 14-17, 2006).

Barczak et al., "GPU-Based Scene Management for Rendering Large Crowds—Slides", AMD Inc., SIGGRAPH Asia 2008, (Dec. 10-13, 2008).

Dudash, B., "Skinned Instancing", NVIDIA Inc., http://developer.download.nvidia.com/SDK/10/direct3d/Source/SkinnedInstancing/doc/SkinnedInstancingWhitePaper.pdf, (Feb. 14-Jul. 26, 2007).

* cited by examiner

PRIOR ART

METHOD AND APPARATUS FOR RENDERING INSTANCE GEOMETRY

CROSS REFERENCE TO RELATED APPLICATIONS

This application claims priority to U.S. Provisional Patent Application No. 61/079,920, filed Jul. 11, 2008.

FIELD OF INVENTION

This application is related to the graphics rendering.

BACKGROUND

The simulation and rendering of massive crowds of characters with a high level of detail from a variety of viewpoints has presented a difficult scene management challenge to the gaming and general graphics community. The latest generations of commodity graphics processing units (GPUs) demonstrate incredible increases in geometry performance, especially with the inclusion of a GPU tessellation pipeline.

Nevertheless, even with state-of-the-art graphics hardware, rendering thousands of complex characters (objects) with high polygonal counts at interactive rates is very difficult and computationally expensive. These characters may be very small (virtually invisible) or not visible at all. The rendering of such invisible or virtually invisible characters with over a million polygons each on the screen can severely impede performance and waste critical computing resources. Some methods of object culling and level of detail (LOD) techniques are required in order to eliminate or minimize the rendering of these invisible or virtually invisible objects.

Graphics rendering is computationally demanding. GPUs typically possess nearly an order of magnitude more computing resources than central processing units (CPUs). This has prompted an increasing interest is using GPUs to perform more general types of calculation. For example, in game applications, many of the calculations used to drive the objects in the game world (such as physics simulation or artificial intelligence) may be accelerated by moving them to the GPU. Doing so, however, complicates the scene management techniques which must be used for efficient rendering.

Figure 1:
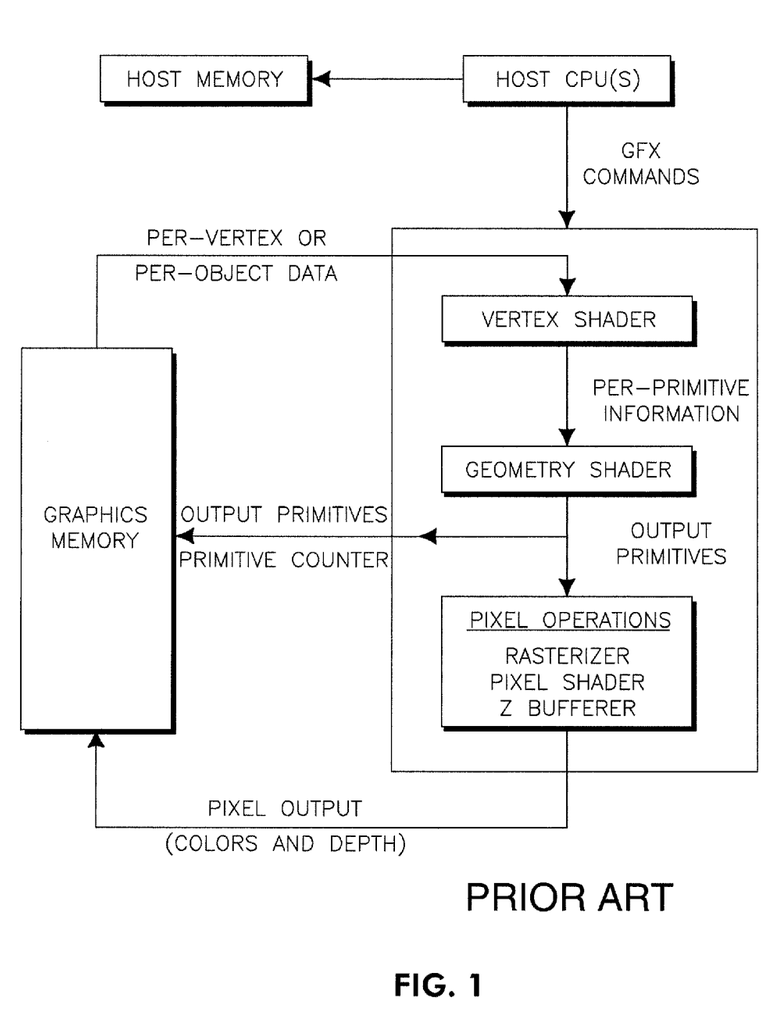
FIG. 1 is an example of a typical graphics system.

FIG. 1 is an example of a conventional graphics system 100. A typical graphics system consists of one or more host central processing units (CPU), a GPU, and corresponding memories (the host and graphics memories may be physically separate, or they may be shared). A graphics application or application program (AP), executing on a host CPU, issues commands to the GPU by means of a graphics application programming interface (API) such as OpenGL or Microsoft's DirectX, which provides an abstract set of commands. The API implementation forwards the commands to a device-specific driver, which is responsible for translating them into the form that can be executed by the GPU.

The programming model of a graphics system is as follows. The CPU is responsible for issuing rendering commands to the GPU, such as configuring the various pipeline stages, or issuing primitives to the graphics pipeline. A primitive is a geometric entity consisting of a set of vertices. The set of supported primitives includes, but is not limited to: points (a single vertex), lines (a pair of vertices), and triangles (three vertices). For each vertex, primitive, or pixel generated by a given rendering command, corresponding application defined programs are invoked by the hardware to perform calculations needed for rendering.

A vertex shader (VS) is a GPU program which is invoked for individual primitive vertices. Each VS invocation obtains a set of attributes for a single input vertex, performs user programmable calculations, and generates an output vertex. The input vertex data is generally retrieved from a vertex buffer (input buffer), which is typically located in graphics memory.

A geometry shader (GS) is a GPU program which is invoked for individual geometric primitives. Each GS invocation receives the VS outputs for a single primitive, performs user programmable calculations, and emits a variable number of output primitives, (or it may not emit any). The GS may be configured for stream output which causes all primitives emitted from the geometry shader to be written consecutively (and in order) to a vertex buffer. The GPU maintains a counter which tracks the number of primitives emitted to a particular buffer.

An API mechanism exists to cause the GPU to re-issue a set of primitives that were previously emitted by a geometry shader using the stored primitive count. This is presented to the application as a special graphics command which is issued by the CPU. For example, in Microsoft's DX10, this is known as a DrawAuto command. In addition, the number of primitives which would be issued by a DrawAuto call may be queried by the application to determine the number of object instances to ultimately render (draw).

Graphics APIs also include support for geometry instancing, whereby multiple copies of a single batch of geometry are issued to the graphics pipeline. With instance rendering, a separate vertex buffer (input buffer) may be used to supply per-instance data to the VS. The VS will be invoked multiple times with the same vertex data, but each invocation of a particular vertex is supplied with different instance data. Geometry instancing is the preferred way to render numerous copies of identical objects in different locations or configurations, because a large number of objects may be submitted for rendering with minimal CPU overhead.

The various shader stages (vertex, geometry, pixel) may be implemented as different threads sharing the same physical hardware, (as is the case in current GPUs such as Advanced Micro Device's ATI Radeon HD4870), or as separate physical hardware (as was the case in earlier generation GPUs). Typically, the programmable stages are vectorized, and operate on a number of elements (primitives and vertices) in parallel (but this does not have to be the case).

Culling and LOD are integral parts of a modern rendering engine. Culling is the process of identifying objects in the scene which are not visible and excluding them so that they will not be rendered. This is generally accomplished by performing some form of visibility test on a bounding volume which encloses the object. LOD refers to the use of simplified geometry or shading for visible objects with less visual importance. These techniques, collectively, are sometimes referred to as "scene management." Given a set of objects to be rendered, it is the job of a rendering engine to identify the visible objects, to assign a level of detail to each visible object, and to issue the necessary rendering commands to the GPU.

The most common type of culling, known as view frustum culling, uses a geometric test to exclude objects which lie outside the field of view of the camera. In current systems, this culling test is performed on the host CPU, prior to submitting the object to the GPU for rendering. Objects which fail the test are simply not submitted.

Another kind of culling is occlusion culling. Occlusion culling eliminates objects that are not visible on a display screen because they are blocked by other objects, such as when a character moves behind a building in a game. One common technique is to separate the scene into fixed regions, and to pre-compute, for each region, the set of regions potentially visible from it (called a potentially visible set or PVS). Objects which do not lie in the PVS of the region containing the camera are simply not rendered. This method requires expensive preprocessing of the scene in order to be effective, and therefore is not suitable for highly dynamic environments.

Modern APIs such as Direct3D 10 also provide conditional rendering functionality which may be used for occlusion culling. To use this technique, the bounding volume of an object is rasterized and compared to a Z-buffer containing the depths of the occluders. The API commands to render the actual object can be issued conditionally, so that they are only carried out if at least one bounding volume pixel is not occluded. This technique can provide effective culling in arbitrary scenes, but it requires the CPU to issue several rendering commands per object, which can quickly create a performance bottleneck.

LOD selection is also typically implemented using the CPU. In a typical LOD system, objects which are determined to be visible may be partitioned into multiple groups, based on their visual importance. One way to do this is to partition the objects based on their distance from the camera. The less important groups may then be rendered in a less costly way (for example, by using simpler geometric models).

Existing implementations of object culling and LOD selection typically perform many of their calculations using the CPU, which imposes a serious performance bottleneck. Occlusion culling using conditional rendering can be particularly harmful to system performance, since it makes it impossible to leverage geometry instancing. Furthermore, CPU based implementations require that the positions of the objects be made available to the CPU. This complicates GPU-based simulation of objects, because it may require expensive data transfers from graphics memory to host memory.

A scalable method for implementing frustum culling, occlusion culling, LOD or other types of object culling is needed, that is compatible with GPU-based simulation of the objects. Such a method should not require any scene preprocessing or occluder selection (anything that is rendered earlier should function as an occluder), nor can it require additional per-object CPU overhead for rendering. In addition, such a method should not require excessive CPU/GPU communication.

SUMMARY

A method and apparatus for rendering instance geometry whereby all culling, level of detail (LOD) and scene management is performed directly on a GPU.

DETAILED DESCRIPTION OF THE EMBODIMENTS

As used herein, the terminology "filtering test" refers to a function that is evaluated for each object to decide whether it should pass the filter. The terms "filtering" and "stream filtering" refer to the whole process of applying the filtering test and keeping things (objects, instance information, etc.) that pass. As used herein, the term "object" refers to any geometric entity that may be rendered on a display screen.

An application program (AP) stores object candidates to be rendered in a buffer, and specifies the configuration of the graphics pipeline for the partitioning and processing of objects. The AP will define in a command stream, the specific steps and respective order for the processing of these objects, including but not limited to the types of culling methods (filtering type) utilized and/or the number of LODs used.

Figure 2:
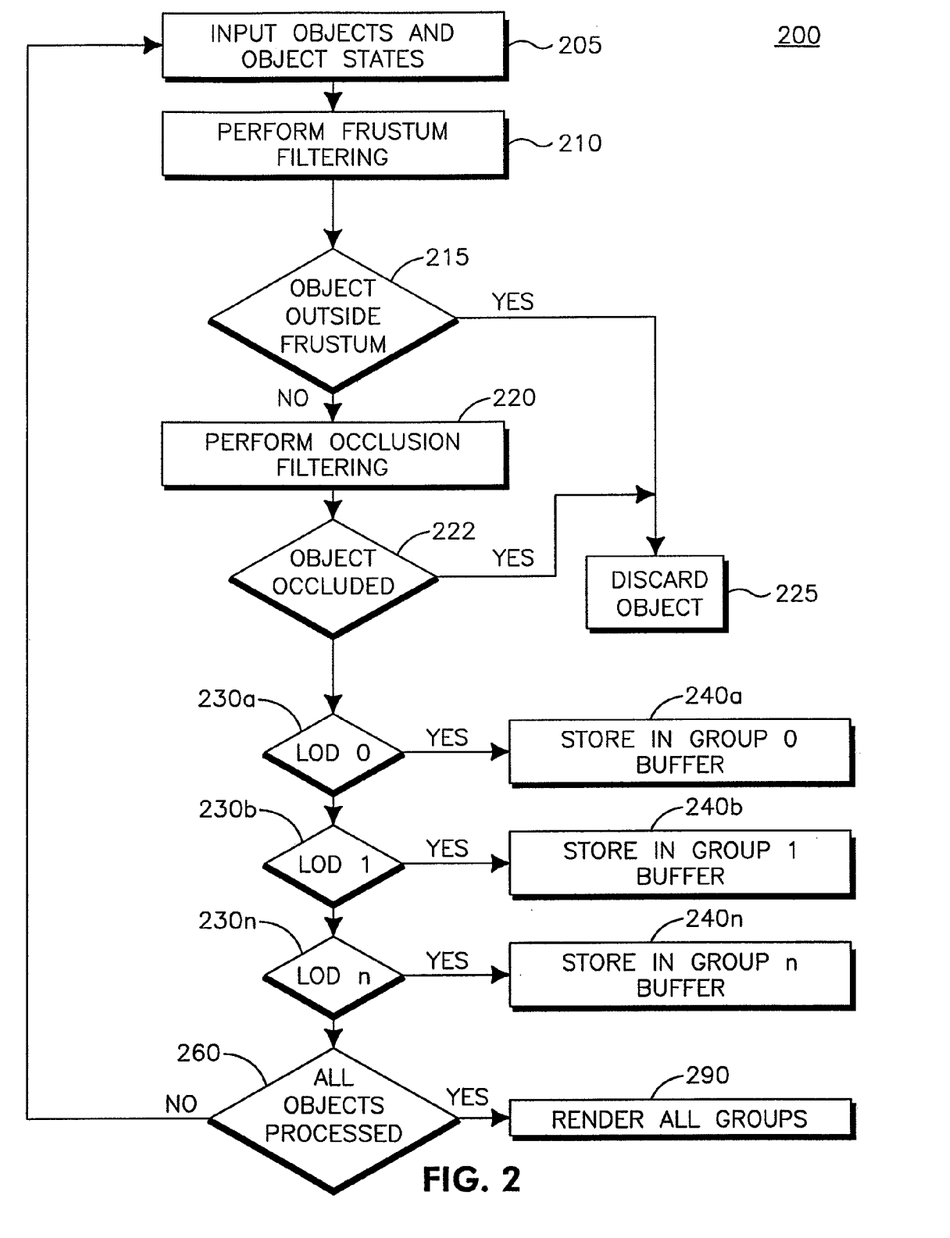
FIG. 2 shows an example instance geometry rendering method based on stream filtering.

FIG. 2 shows an example instance geometry rendering method 200 based on stream filtering. Objects of the same LOD are stored in an LOD specific buffer (e.g., a bin). One skilled in the art will recognize that an object may be stored in multiple LOD buffers to facilitate blending that may occur during the rendering of a given object. In this example, the AP has defined that objects and their respective object states are input at 205, and frustum filtering 210, occlusion filtering 220 and LOD 0 to LOD n filtering 230a-230n will be performed on all objects before they are rendered.

Referring to FIG. 2, an object and its respective object state is input 205. Frustum culling filtering is performed 210. If the object is outside of the view frustum, the object is discarded 225. Otherwise, occlusion filtering is performed on the object state 220. If the object is occluded, the object is discarded 225. Otherwise, the LOD for the object state is then determined (this is an example of multipass LOD determination) to determine the LOD of the object 230a-230n. The object is stored in a LOD specific buffer (output buffer) (240a-240n). For example, if the object is LOD 0, (such as having a lowest level of detail), it is stored in the group 0 buffer 240a; if the object is LOD 1, (such as having a greater level of detail), it is stored in the group 1 buffer 240b; and this continues until the object having LOD n, (such as having a greatest level of detail), it is stored in the group n buffer 240n. An object may exist in more than one LOD and as such the same object will be stored in multiple LOD specific buffers, group 0 to group n. If all of the objects have been processed 260, all of the objects are rendered 290 from the respective LOD specific buffers, in this example, group 0 through group n.

In an alternative embodiment, a single pass LOD generator may be used to sort the objects into distinct buffers for each respective LODs. A single pass LOD generator determines the objects LOD in a single LOD program instead of one for each LOD.

Figure 3:
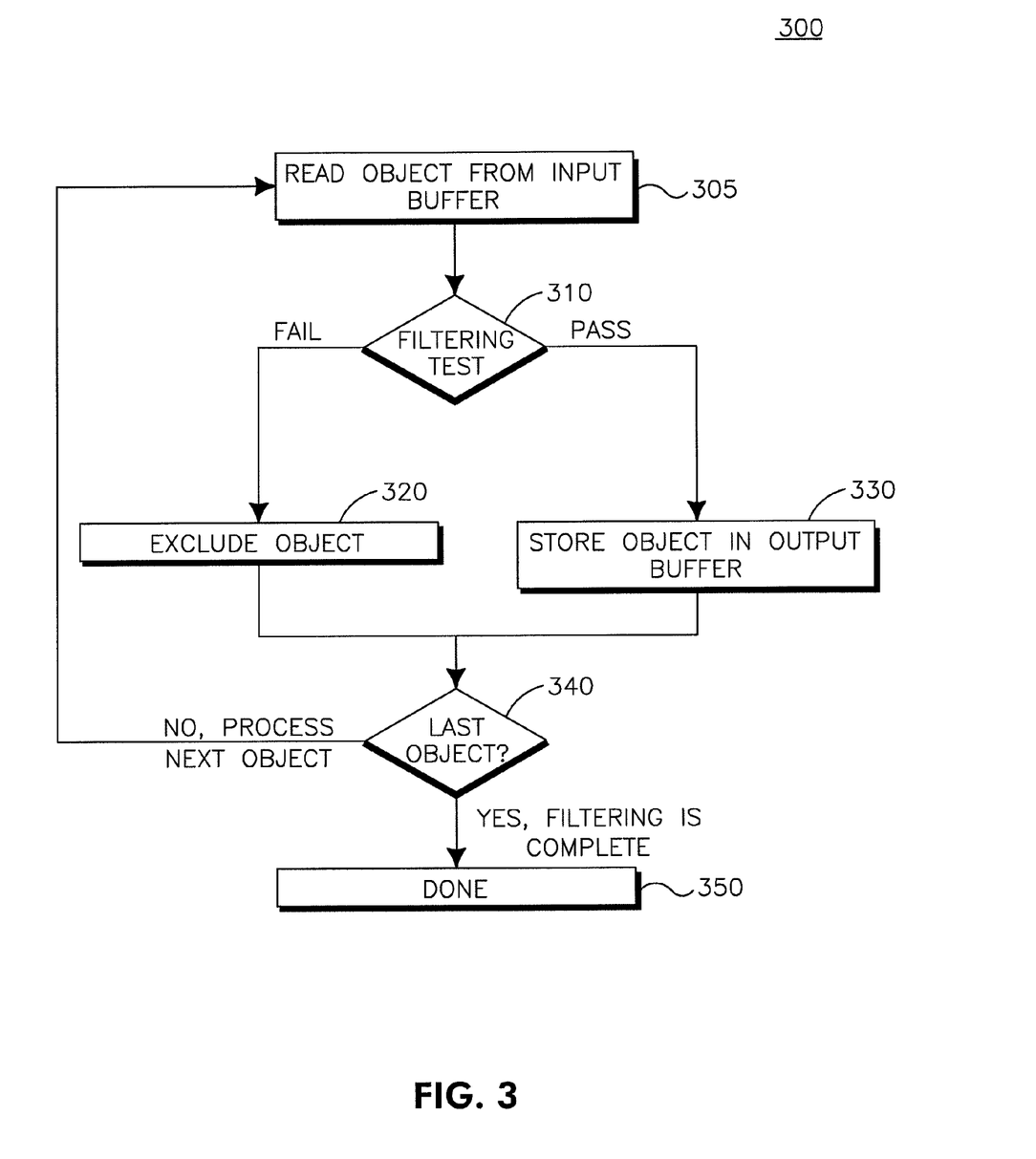
FIG. 3 shows an example stream filter program flow.

FIG. 3 shows an example of a filtering program flow 300 (e.g., including but not limited to, frustum or occlusion filtering). All objects and their respective object states are input at 305. A particular filtering test (including, but not limited to, frustum or occlusion filtering) is performed on a first object 310. If the object passes the test, it is stored in an output buffer 330. If the object fails the filtering test (e.g., the object is occluded), it is excluded from rendering 320. If this is the last object 340 then this filtering stage (multiple filters may be applied) is completed 350. Otherwise, the process continues for the next object at 305.

As is known to those skilled in the art, multiple objects and their respective object states may be processed simultaneously. For example, if there are three objects: A, B and C, the object states of A, B and C will be input and frustum culling filtering may be performed in parallel on A, B and C. A GPU will receive a configuration command from the AP followed by another command specifying the number of objects. In this example, referring back to FIG. 2, the GPU will create three instances of the frustum culling filter 210. A will be submitted to a first instance, B to a second instance and C to a third instance. When frustum filtering has been performed on all three objects (A, B and C), the objects that pass frustum culling filtering (in this example, up to 3 objects) are submitted for occlusion filtering 220. The GPU will create up to three instances of occlusion filter 220. For example, assuming A, B and C passed frustum culling filtering, A will be submitted to a first instance, B to a second instance, and C to a third instance. When occlusion filtering has been performed on all three objects (A, B and C), the objects that passed occlusion filtering are submitted for LOD determination 230a-230n. Similarly, the GPU will create up to three instances of each LOD determination test, three of LOD 0 230a, three of LOD 1 230b and three of all additional LOD tests through LOD n 230n. After all of the objects have been processed, all of the objects are rendered from the respective LOD specific buffers (output buffers), in this example, group 0 through group n.

One skilled in the art will recognize that a very large number of objects may be processed at any given time. The number of objects actually processed in parallel will depend upon various system resources and constraints, including at least the speed of a processor or the amount of available graphics memory.

In one embodiment occlusion culling is accomplished based on a Hi-Z map, a technique based on Z pyramids. A Hi-Z map is a series of depth images, where the coarser (lower) resolution images contain the maximum depths of sets of pixels in the finer resolution images. It is assumed that a depth buffer exists containing the distance to occluding geometry for each screen pixel, which is generally obtained by rendering the occluding geometry. These are the same values generally used for Z buffering, and are correlated to the distance from the image plane to the 3D point visible under each pixel. Starting with this depth buffer, a series of coarser depth buffers is generated by repeatedly dividing the size of the buffer by in half (rounding down), until a 1×1 buffer is reached. This process is shown in Table 1.

TABLE 1

| 1 | 1 | 0 | 0 |              |   |   |              |   |
|---|---|---|---|--------------|---|---|--------------|---|
| 2 | 1 | 2 | 0 | Reduce (Max) | 2 | 2 | Reduce (Max) | 5 |
| 1 | 2 | 3 | 0 |              | 3 | 5 |              |   |
| 3 | 2 | 4 | 5 |              |   |   |              |   |

Each pixel in a coarser level contains the maximum depth of corresponding pixels in the finer level below it. This is generally the maximum over a 2×2 group of pixels. However, for odd-sized images, the coarse pixels on the boundaries must cover additional fine pixels to ensure that the entire screen is accounted for.

Construction of the Hi-Z map is implemented by processing successive levels in fine-to-coarse order. For each pixel in a coarser level, the maximum of the corresponding depth values in the next finest level is determined and stored. This process is repeated until the topmost (1×1) level contains the largest depth value that was present in the input Z buffer. This computation may be implemented on the GPU by binding each coarse level as a render target, rendering screen-filling geometry, and configuring the pixel shader to fetch from the finer level and determine the maximum depth value.

After Hi-Z map construction, a stream filtering pass may be performed which uses the information in the Hi-Z map to execute occlusion culling. In order to ensure a stable, high frame rate, it is desirable to limit the number of pixels that are fetched for each object, and to avoid divergent flow control between object instances. This is accomplished by exploiting the hierarchical structure of the Hi-Z map.

Occlusion culling operates by computing a bounding rectangle which fully encloses the object on the screen, and using a fixed set of pixels from the Hi-Z map to determine whether or not the rectangle is occluded. The bounding rectangle is derived based on the position of a bounding sphere centered on the object (as seen from the camera).

Figure 4:
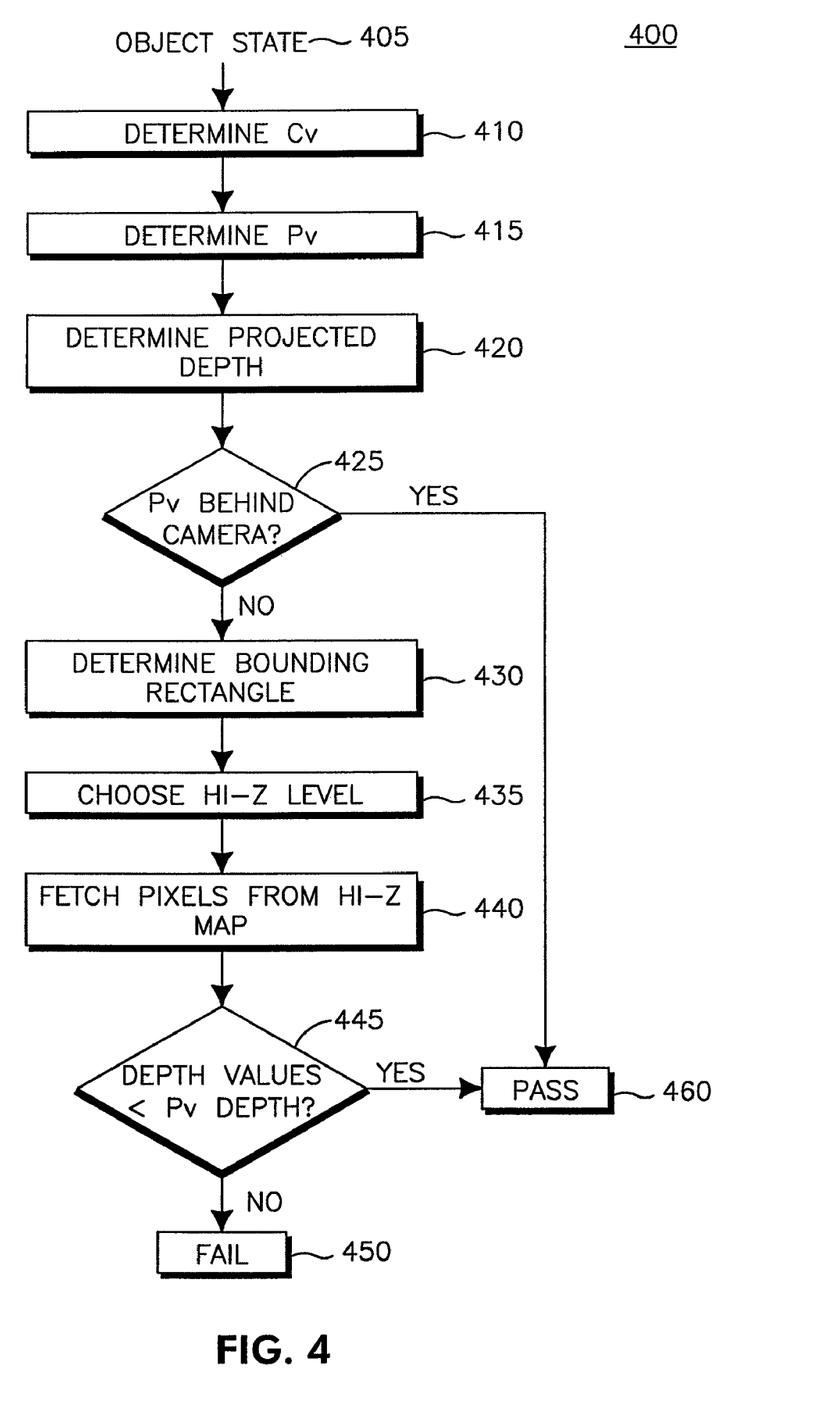
FIG. 4 shows an example of occlusion culling using a Hi-Z map.

One example embodiment of a method 400 of occlusion culling using a Hi-Z map is shown in FIG. 4. For each object state 405, the sphere center, Cv 410, is determined by transforming the center of the object's bounding sphere into camera-relative coordinates. The location of the object's bounding sphere is either stored directly in the object state, or else derived from it. The closest point to the camera on the sphere, Pv 415, is determined by the following formula:

$$Pv = Cv - \left(\frac{Cv}{|Cv|}\right)r; \qquad \text{Equation (1)}$$

where r is the sphere radius (both Pv and Cv are relative to the camera position).

The projected depth 420 of Pv is in the same space as the depth values in the Hi-Z map, and is determined by applying a standard projection transformation to the point Pv and performing the perspective division as is normally done for rasterization.

Figure 5:
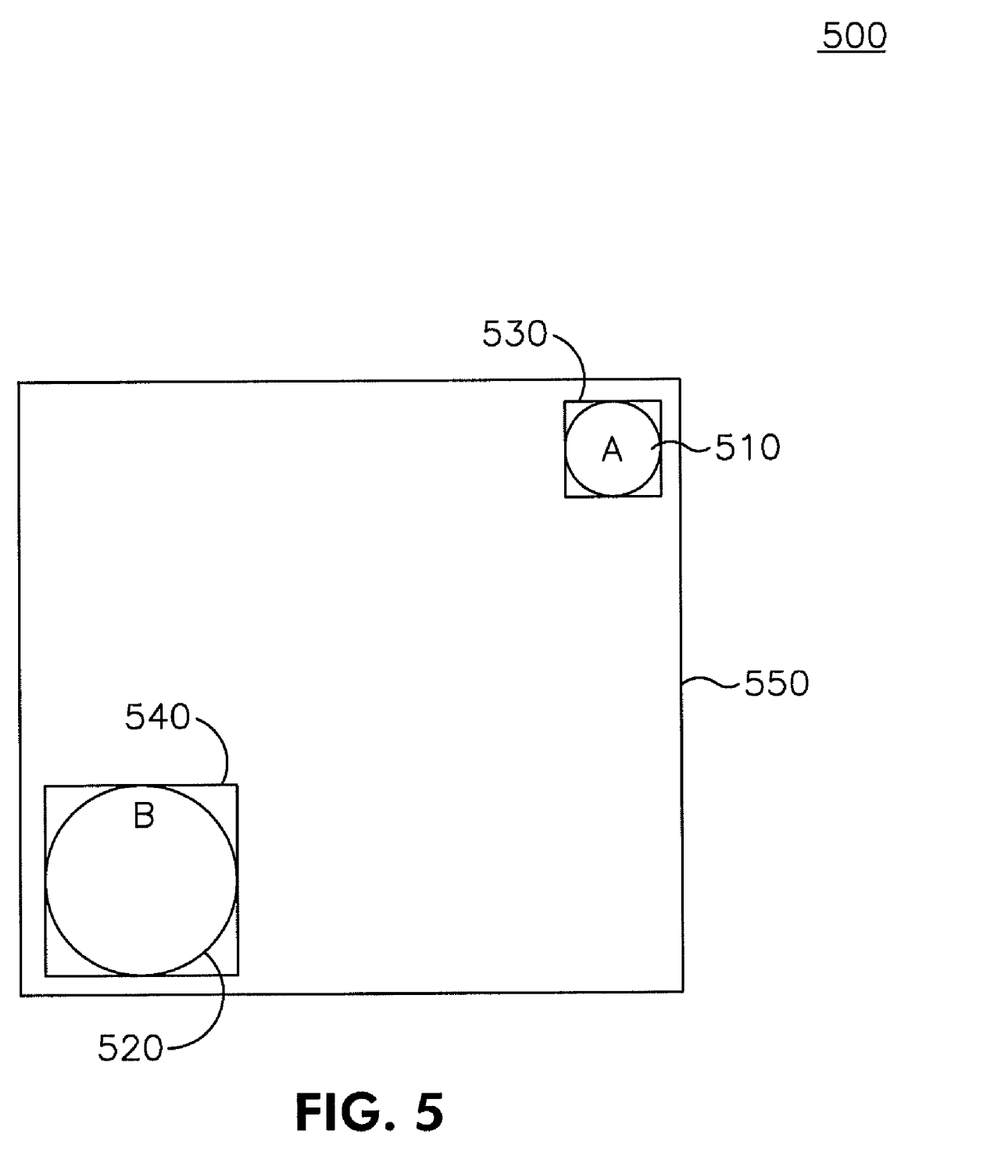
FIG. 5 shows example bounding rectangles and bounding spheres.

In the special case where the camera lies inside the bounding sphere, then Equation (1) may result in a point behind the image plane whose projected depth is non-negative, This means that Pv is behind the camera. A test for this condition is made at 425. If Pv is behind the camera 425, then the object (e.g., character) must not be culled to prevent a false occlusion. The bounding rectangle (usually a square) on the screen which fully encloses the bounding sphere is then determined 430. One graphical example of bounding spheres and rectangles 500 is shown in FIG. 5. The bounding spheres 510 and 520 and the rectangles 530 and 540 are shown for two hypothetical objects A and B. The sides of the rectangles 530 and 540 must be aligned to both the x and y axes of the screen 550, as shown in FIG. 5.

Figure 6:
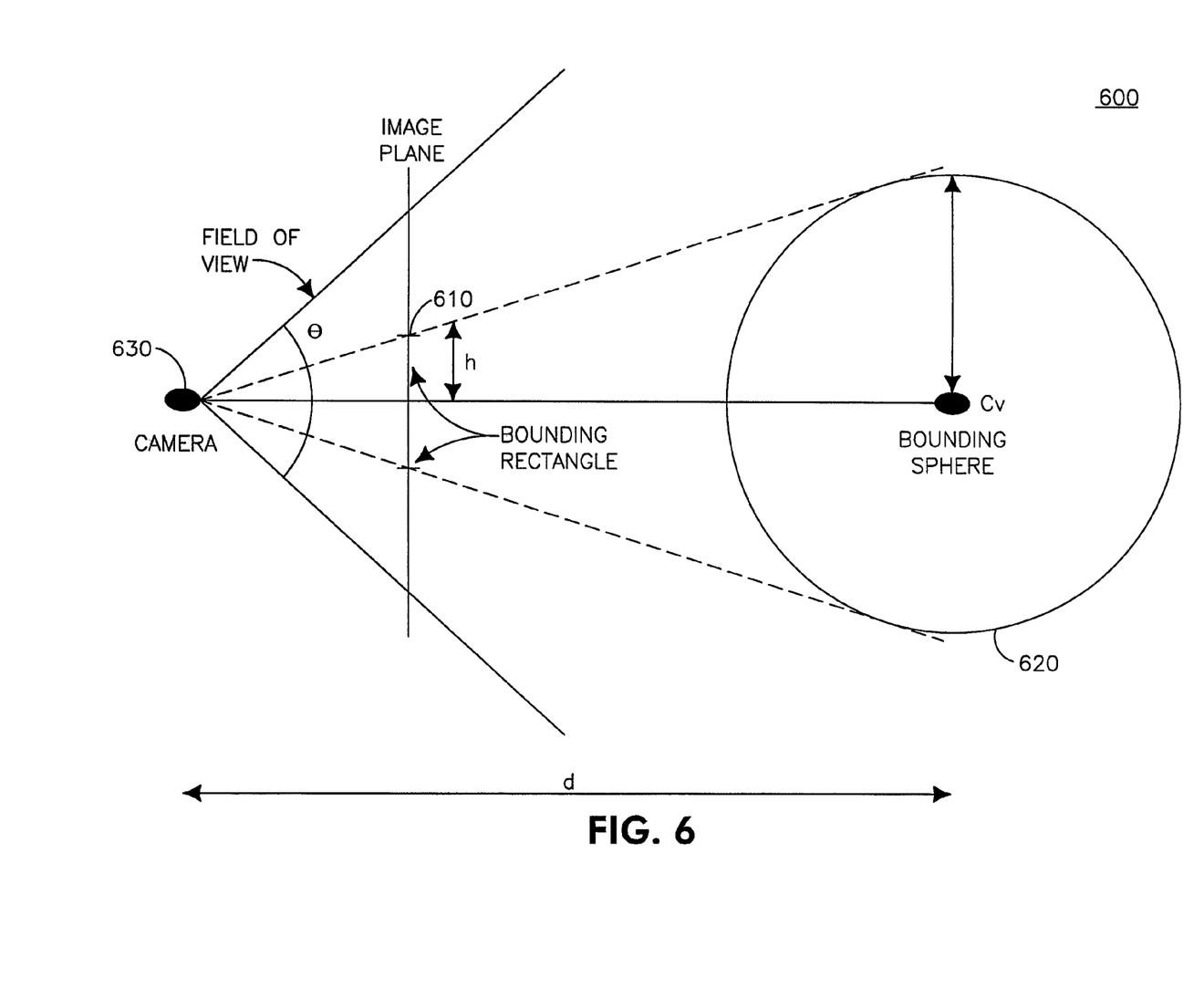
FIG. 6 is an example method for determining a bounding rectangle from a bounding sphere.

A method 600 for the determination of the bounding rectangle 610 from the bounding sphere 620 is illustrated in FIG. 6. The sphere's 610 projected height in normalized device coordinates (ND C) space is approximated based on its distance (d) from the camera 630. The height (h) of the rectangle 610 can be approximated as follows, where d is the distance from the sphere center to the camera 630, and θ is the vertical field of view of the camera 630:

$$h = \frac{r}{d\tan\left(\frac{\theta}{2}\right)}.$$ Equation (2)

Because of the change in coordinate systems, the height h in NDC space is equal to half the rectangle's 610 height in camera relative coordinates. The width (w') of the rectangle 610 is equal to h divided by the screen aspect ratio. The width (W) of the rectangle 610, in pixels, is equal to w', multiplied by half the width of the screen.

The method illustrated in FIG. 6 is a close approximation to the true bounding rectangle. It will underestimate the size of the rectangle when the sphere is close to the camera or under extreme fields of view, when the sphere is near the corners of the screen. In practice, an application may need to pad the size of the object's bounding sphere to compensate for the approximation. An alternative embodiment may calculate a conservative bounding rectangle by deriving a screen-facing quadrilateral in camera space which encloses the sphere, computing the screen positions of its corners, and using their extents on each of the screen axes to derive a conservative rectangle. This embodiment requires more computation than the approximation presented above.

Referring back to FIG. 4, a specific level in the Hi-Z map at which the rectangle will cover no more than one 2×2 pixel neighborhood is chosen 435 The level is determined by ensuring that the size of the square is less than the width of a single texel at the chosen resolution. The lowest level i is chosen such that:

$$\left(\frac{W}{2^i}\right) < 1.$$ Equation (3)

This yields the following equation for i:

$$i = \lceil \log_2(W) \rceil.$$ Equation (4)

If the width of the screen is less than its height, the height of the rectangle (in pixels) should be used instead. This pixel neighborhood is then fetched from the map 440, and the depth values are compared against the projected depth of the point Pv 420.

At 445, if all four pixels (the chosen 2×2 pixel neighborhood) contain depth values less than the depth of the point Pv 420, then it is guaranteed that the entire sphere, and therefore the entire object, is occluded (i.e. not visible). This results in a failed condition 450, which means that the object currently being analyzed is eliminated (culled) and an LOD determination will not be performed. Otherwise, the object is visible, resulting in a pass condition 460, and the object will be submitted to determine its LOD (e.g., in FIG. 2, 230a-230n).

The described test will never conclude that a visible object is occluded, but it may falsely conclude that an occluded object is visible. The test may be made more exact by using a larger neighborhood, and fetching additional pixels from finer levels of the Hi-Z map.

An example GPU 700 configured to implement the methods described above is shown in FIG. 7. The GPU 700 comprises a processor 702 including a VS component (VSC) 705 configured to execute a VS, a GS component (GSC) 720 configured to execute a GS and optionally a rasterizer 730, a pixel shader 740, and a Z bufferer 750, and a memory component, graphics memory 760, optionally including an input buffer 762 (there may optionally be multiple input buffers), an output buffer 764 (there may optionally be multiple output buffers, e.g., one for each LOD group) and a counter 766.

Figure 7:
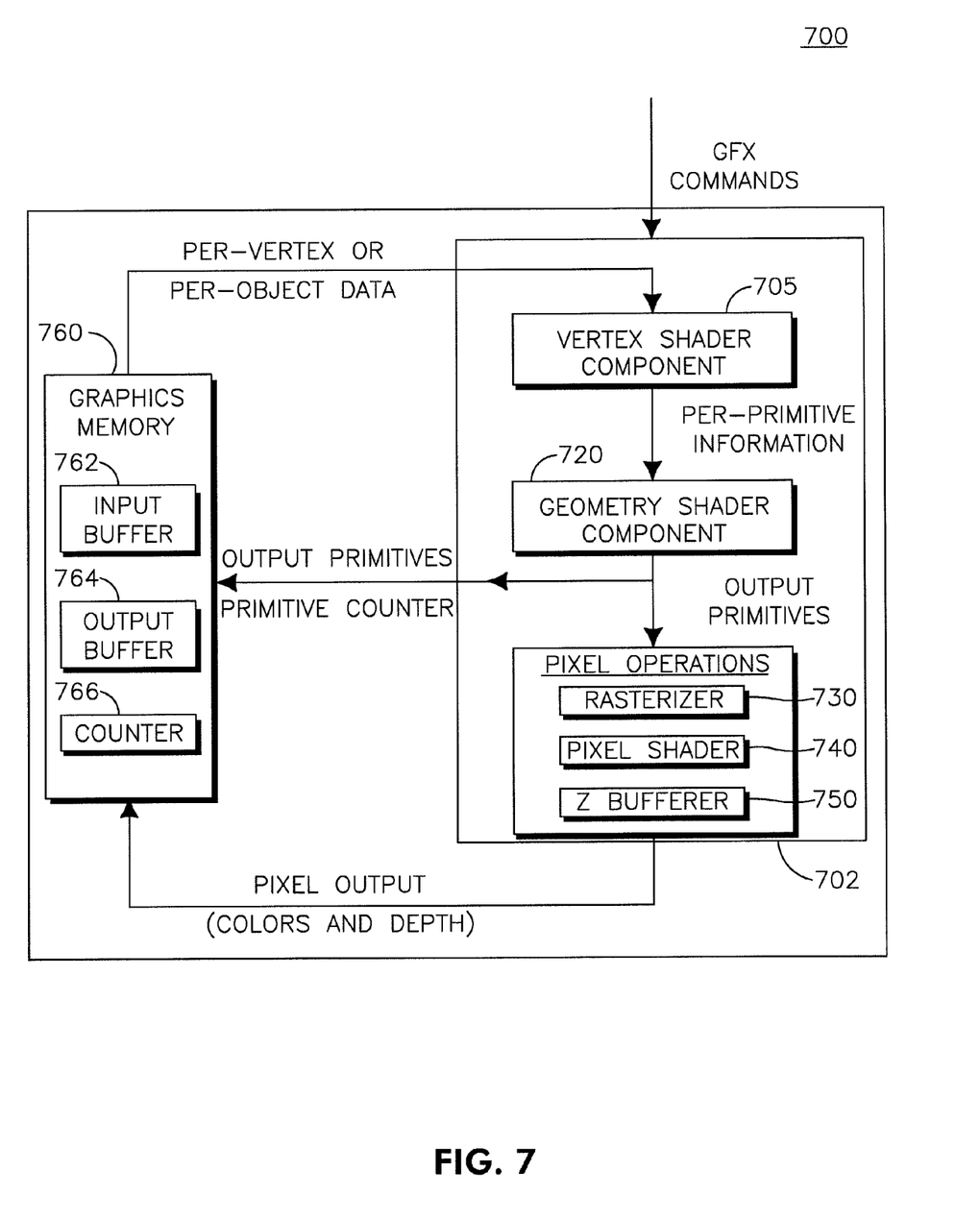
FIG. 7 is an example of a GPU configured to implement the present invention.

In one embodiment, GPU processor 702 receives graphics commands from an AP running in a Host CPU. The graphics commands may contain the specific graphics pipeline configuration and the number of objects to be processed by the GPU processor 702. The AP also stores object candidates (objects) to be rendered in an input buffer 762 in graphics memory 760.

Figure 8:
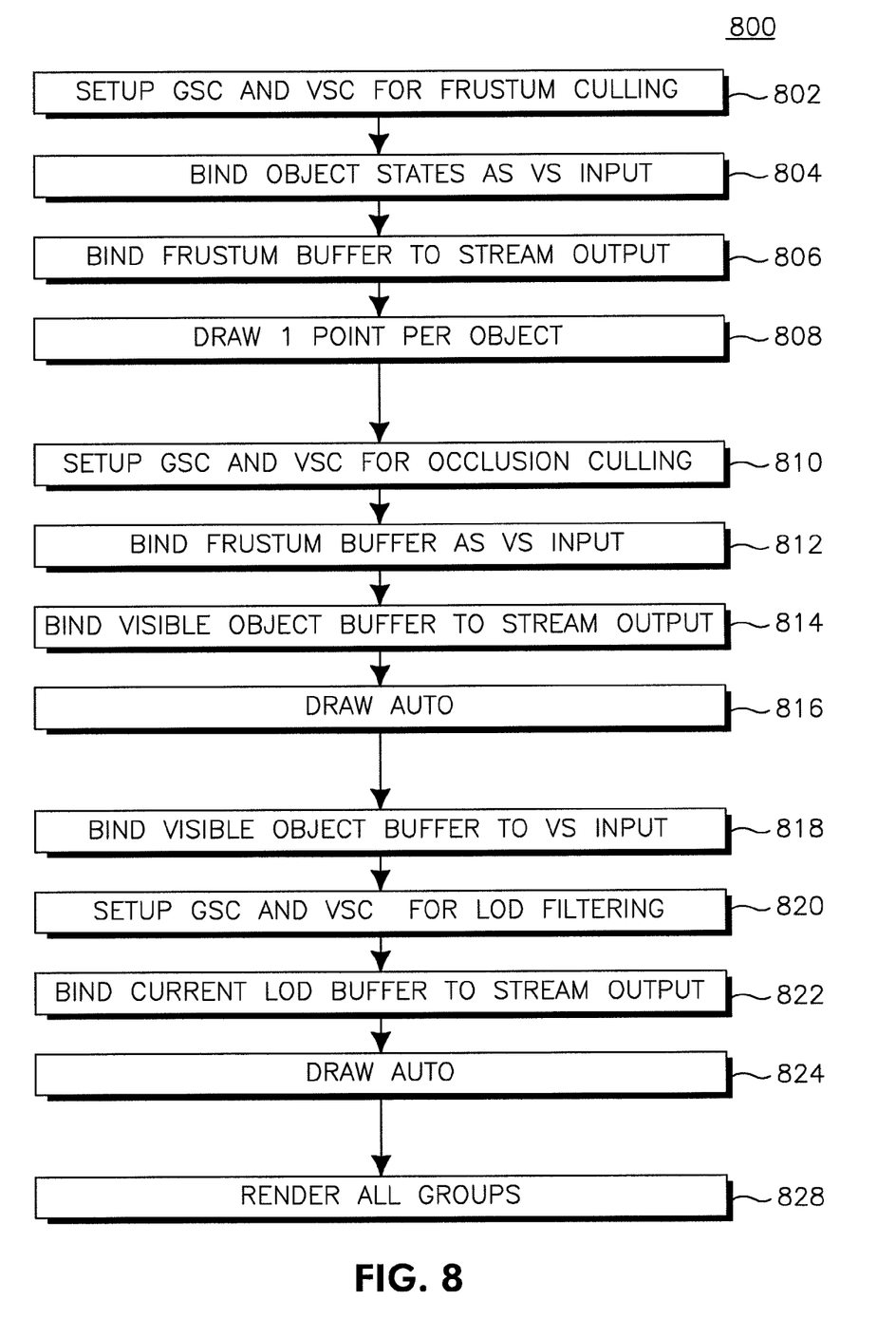
FIG. 8 is an example of a sequence of commands from an AP that is used to configure a graphics pipeline.

An example of an AP command stream 800 is shown in FIG. 8. The command stream 800 begins with a command to setup the VSC 705 and GSC 720 for frustum culling 802. This is followed by a command to bind the object states as VS input 804. Binding associates a buffer with a slot in the pipeline. This is followed by a command to bind the frustum buffer (one example of an input buffer) to stream output 806 (an output buffer). Next, the command stream includes a call to a graphics API to draw 1 point per object 808. In this example, 802-808 are required to configure the graphics pipeline to perform frustum culling. The frustum culling commands are followed by a sequence of commands that set up the graphics pipeline to perform occlusion culling. These commands include a command to setup the VSC 705 and GSC 720 for occlusion culling 810, a command to bind the frustum buffer as VS input (the output from frustum culling filtering is now input for occlusion filtering), a command to bind the visible object buffer (an example of an output buffer) to stream output 814 and a command to the graphics API DrawAuto 816. Commands required to configure LOD determination follow the occlusion configuration commands. These commands include a command to bind the visible object buffer (now used as an input buffer) to VS input 818, a command to setup the VSC 705 and GSC 720 for LOD filtering 820, a command to bind the LOD buffer (an output buffer) to stream output 822 and a call to the graphics API DrawAuto 824. If more than one LOD is specified (as is usually the case), the command stream will contain multiple sets of commands similar to 818-824 to configure the pipeline to process each LOD (e.g., the command stream would contain additional sets of commands 818-824 or similar configuration commands). The last command is render all groups 828.

Referring back to FIG. 7, the VSC 705 is configured to receive a "vertex" which contains the state of a particular object (the object states are stored in vertex buffers) from graphics memory 760. Graphics memory 760 may optionally include an input buffer 762 (multiple input buffers may optionally exist) containing object states, an output buffer 764 (multiple output buffers may optionally exist) to receive and store the states of the objects that pass the filtering tests and a counter 766 for counting how many objects pass the filtering tests.

The VSC 705 performs a filtering test whose result is sent to the GSC 720. The GSC 720 is configured to conditionally store a point primitive containing the object state in graphics memory 760 based on the result of the filtering test and, optionally, a filtering test in output buffer 764. As described above, filtering tests include, but are not limited to, one or more of view frustum culling or occlusion culling using the Hi-Z map. All objects are then rendered from graphics memory 760.

In another embodiment, a stream filter may also be implemented by performing the entire calculation in the GSC 720, instead of the VSC 705. In this case, the VSC 705 is configured to simply pass the object state through the pipeline to the GSC 720. The reasons for separating these functions include:

1. On some GPUs, throughput for GS operation can be lower than for VS operation; or
2. For ease of programming, to de-couple the filtering test from the conditional emission.

By leveraging this stream filtering technique, culling and LOD determination may be implemented for instanced objects directly on graphics hardware, without CPU intervention.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions (such instructions capable of being stored on a computer readable media). The results of such processing may be maskworks that are then used in a semiconductor manufacturing process to manufacture a processor which implements aspects of the present invention.

What is claimed is:

1. A method for instance geometry rendering in a graphics processing unit (GPU) comprising:
    stream filtering, wherein the stream filtering comprises:
        receiving a command stream;
        processing the command stream comprising:
            extracting a filtering type;
            determining an order of processing; and
            extracting a number of levels of detail (LODs) for all objects;
        receiving an instanced object and its respective object state;
        performing a filtering test on the object based on the filtering type;
        culling the object if it fails the filtering test;
        determining the LOD of the object and storing the object in at least one buffer in the GPU according to the LOD; and
        rendering the object from the at least one buffer based on geometry rendering.

2. The method of claim 1 wherein the filtering type comprises at least one of view frustum filtering or occlusion filtering using a Hi-Z map.

3. The method of claim 1 wherein the filtering type comprises:
    occlusion filtering using a Hi-Z map having a series of depth images, wherein coarser resolution images contain maximum depths of sets of pixels in finer resolution images.

4. The method of claim 1 wherein the filtering type comprises:
    generating the Hi-Z map including:
        inputting a depth buffer with a corresponding depth buffer size; and
        generating a series of coarser depth buffers by dividing the depth buffer size by two and rounding down until a 1×1 depth buffer is reached.

5. The method of claim 4 wherein occlusion culling using the Hi-Z map comprises:
    determining a bounding sphere center for each object state;
    determining a closest point to a camera on the bounding sphere;
    determining a projected depth of the closest point to a camera on the sphere;
    not culling the object, if the camera lies inside the bounding sphere;
    determining a bounding rectangle which fully encloses a bounding sphere;
    choosing a specific level in the Hi-Z map based upon the rectangle;
    fetching a pixel neighborhood based on the specific level;
    culling the object, if all pixels in the fetched pixel neighborhood contain depth values less than the closest point to the camera; and
    submitting the object for LOD determination.

6. The method of claim 1 wherein:
    the at least one buffer is a plurality of buffers;
    storing the object includes selecting one of the plurality of buffers according to the LOD of the object;
    wherein all objects are sorted in the buffers by LOD; and
    rendering the object includes rendering together all objects in one of the plurality of buffers.

7. A graphics processing unit (GPU) configured to perform stream filtering comprising:
    a command processor configured to receive a command stream;
    the command processor further configured to process the command stream to:
        extract a filtering type;
        determine an order of processing; and
        extract a number of levels of detail (LODs) for all objects;
    a graphics memory configured to receive an instanced object and its respective object state;
    a vertex shader component (VSC) configured to perform a filtering test on the object based on the filtering type;
    a geometry shader component (GSC) configured to cull the object if it fails the filtering test;
    the VSC further configured to determine the LOD of the object
    the GSC further configured to store the object in the graphics memory according to the LOD; and
    the command processor further configured to render the object from graphics memory based on geometry rendering.

8. The GPU of claim 7 wherein the filtering type comprises at least one of view frustum filtering or occlusion filtering using a Hi-Z map.

9. The GPU of claim 7 wherein the filtering type comprises:
    occlusion filtering using a Hi-Z map having a series of depth images, wherein coarser resolution images contain maximum depths of sets of pixels in finer resolution images.

10. The GPU of claim 7 wherein the filtering type comprises occlusion filtering using a Hi-Z map and the command processor further configured to generate the Hi-Z map comprising:
  the command processor further configured to input a depth buffer with a corresponding depth buffer size; and
  the command processor further configured to generate a series of coarser depth buffers by dividing the depth buffer size by two and rounding down until a 1×1 depth buffer is reached.

11. The GPU of claim 7 wherein the filtering type comprises occlusion filtering using a Hi-Z map having
  the VSC further configured to determine a bounding sphere center for each object state;
  the VSC further configured to determine a closest point to a camera on the bounding sphere;
  the VSC further configured to determine a projected depth of the closest point to a camera on the sphere;
  the VSC further configured to not cull the object, if the camera lies inside the bounding sphere;
  the VSC further configured to determine a bounding rectangle which fully encloses a bounding sphere;
  the VSC further configured to choose a specific level in the Hi-Z map based upon the rectangle;
  the VSC further configured to fetch a pixel neighborhood based on the specific level;
  the VSC further configured to cull the object, if all pixels in the fetched pixel neighborhood contain depth values less than the closest point to the camera; and
  the VSC further configured to submit the object for LOD determination.

12. The GPU of claim 7 wherein:
  the graphics memory includes a plurality of bins;
  the GSC configured to store the object includes selecting one of the bins according to the LOD of the object;
  wherein all objects are organized in the bins by LOD; and
  the command processor configured to render the object from graphics memory includes rendering together all objects in one of the bins.

13. A non-transitory computer readable storage medium comprising:
  a first set of instructions adapted to create a processor including a graphics processing unit (GPU) with memory having a second set of instructions, wherein the GPU is configured to implement the second set of instructions, the second set of instructions comprising:
  a stream filtration code segment for stream filtering comprising:
    a reception code segment for receiving a command stream;
    a processor code segment for processing the command stream comprising:
      an extraction code segment for extracting a filtering type;
      a determination code segment for determining an order of processing; and
      an extraction code segment for extracting a number of levels of detail (LODs) for all objects;
    a reception code segment for receiving an instanced object and its respective object state;
    a performer code segment for performing a filtering test on the object based on the filtering type;
    a culler code segment for culling the object if it fails the filtering test;
    a determination code segment for determining the LOD of the object and storing the object in at least one buffer in the GPU according to the LOD; and
    a renderer code segment for rendering the object from the at least one buffer based on geometry rendering.

14. The computer readable storage medium of claim 13 wherein the extraction code segment filtering type comprises at least one of view frustum filtering or occlusion filtering using a Hi-Z map.

15. The computer readable storage medium of claim 13 wherein the extraction code segment filtering type comprises:
  occlusion filtering using a Hi-Z map having a series of depth images, wherein coarser resolution images contain maximum depths of sets of pixels in finer resolution images.

16. The computer readable storage medium of claim 15 wherein occlusion culling using the Hi-Z map comprises:
  a determination code segment for determining a bounding sphere center for each object state;
  a determination code segment for determining a closest point to a camera on the bounding sphere;
  a determination code segment for determining a projected depth of the closest point to a camera on the sphere;
  a culling code segment for not culling the object, if the camera lies inside the bounding sphere;
  a determination code segment for determining a bounding rectangle which fully encloses a bounding sphere;
  a selection code segment for choosing a specific level in the Hi-Z map based upon the rectangle;
  a fetcher code segment for fetching a pixel neighborhood based on the specific level;
  a culling code segment for culling the object, if all pixels in the fetched pixel neighborhood contain depth values less than the closest point to the camera; and
  a submission code segment for submitting the object for LOD determination.

17. The computer readable medium of claim 13, the second set of instructions further comprising:
  a generator code segment for generating a Hi-Z map comprising:
    an input code segment for inputting a depth buffer with a corresponding depth buffer size; and
    a generator code segment for generating a series of coarser depth buffers by dividing the depth buffer size by two and rounding down until a 1×1 depth buffer is reached.

18. The computer readable medium of claim 13 wherein the first set of instructions or the second set of instructions are hardware description language (HDL) instructions.

19. The computer readable storage medium of claim 13 wherein
  the at least one buffer is a plurality of buffers;
  storing the object includes selecting one of the plurality of buffers according to the LOD of the object;
  wherein all objects are sorted in the buffers by LOD; and
  rendering the object includes rendering together all objects in one of the plurality of buffers.

* * * * *